Patented June 2, 1936

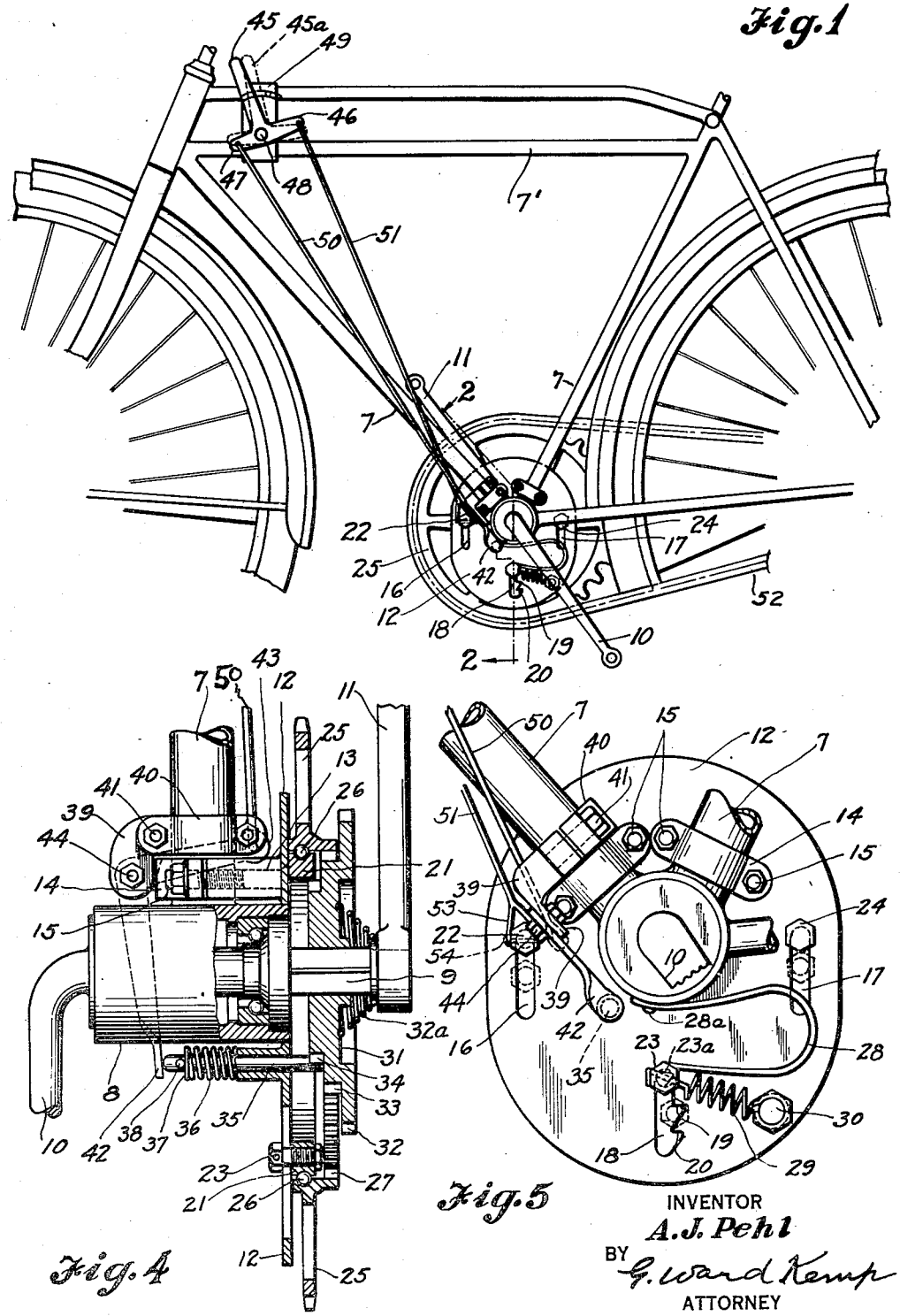

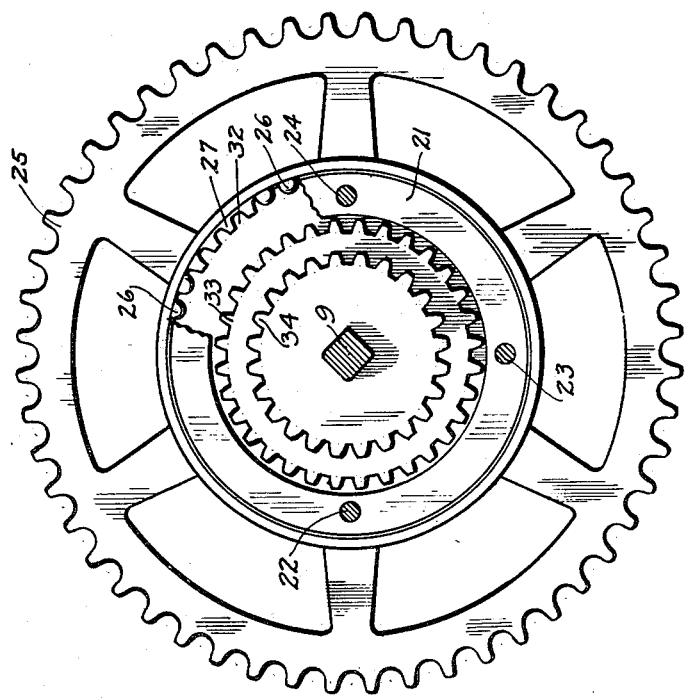

2,042,861

UNITED STATES PATENT OFFICE 2,042,861

MULTIPLE SPEED BICYCLE

Andrew J. Pehl, Seattle, Wash.

Application January 23, 1935, Serial No. 2,985

3 Claims. (Cl. 208—154)

This invention relates to bicycles, and particularly to bicycles with a plurality of speeds.

In the operation of bicycles, especially in cities, and in hilly localities it is important that a bicycle should be driven at various speeds for safety and for climbing hills. A low speed provides a high degree of power, and safety, while a higher speed is desirable on quiet streets, and on level country roads.

Various attempts have been made to provide attachments for plural speeds for bicycles, generally by placing such attachments in direct or close connection with or on the driven axle, or between the wheel spokes. Such arrangements have been unsatisfactory and often caused weakness and uncertainty in the wheel, and especially in the wheel hub operation.

It is therefore an object of this invention to provide a single device to be attached to the frame of any bicycle adjoining the crank shaft, with a plurality of gears of different sizes to be driven by the ordinary pedals and crank shaft. The different gears to be alternately, placed in mesh with an outer ring gear attached to the sprocket wheel used for driving the ordinary chain and rear wheel axle.

A further object is to provide a holding plate, to be attached to the frame of the bicycle, on which plate is adjustably mounted a ring gear and sprocket wheel. Together with means for shifting the positions of the ring gear for throwing its teeth in mesh with pinion gears of different sizes, said latter gears slidably mounted on the crank shaft, to be driven by ordinary foot pedals.

With these and other objects, I have illustrated my invention by the accompanying drawings of which:

Figure 1 is a fragmentary part of a bicycle showing the device mounted thereon,

Figure 2 is a section view upon line 2—2 of Figure 1,

Figure 3 is a section view upon line 3—3 of Figure 2, showing the gears and driving ring in mesh position for highest speed, Figure 4 is the same section as Figure 2 but with gears and ring in mesh for intermediate speed, Figure 5 is an enlarged view of the holding plate, Figure 6 is a detail view showing clamp attachments for holding the plate to the frame.

Like numerals on the different figures represent like parts.

Numeral 7 represents the frame posts of any bicycle. 8 shows the ordinary housing for the crank bearing. 10 and 11 represent right and left crank arms. The foregoing parts are common to all bicycles. 12 represents a holding plate, for supporting a bearing ring 21 adjustably mounted thereon. The plate 12 is attached rigidly to the posts 7, by a spacing block 13, clamps 14 and bolts 15. The plate is provided with slots 16, 17 and 18. Slot 18 has notches 19 and 20 along one side thereof for a bolt 23 which supports a bearing ring 21 at different positions or elevations. The bolts 22, 23 and 24 are threaded into one side of the ring at their points, while their shanks are loosely positioned through the slots 16, 17 and 18 for shifting the ring gear where desired. The bolt 24 also serves as a pivot on which said ring is rocked when the bolt 23 is to be moved to and from either of the notches 19 and 20 for different positions of the bearing ring 21. A sprocket wheel 25 is rotatably mounted around the ring 21 on bearing balls 26 which balls are positioned in a race groove provided on the inside of the sprocket, and around the perifery of the ring 21. The sprocket carries the internal teeth 27 and forms a ring gear, to be driven by pinion gears 32, 33 and 34 of different sizes for different speeds. Said pinions are attached together forming a cone 31 which is slidably mounted on a squared section of the crank shaft 9. The cone is normally pressed inward toward the holding plate 12 and in alinement with the ring gear of the sprocket, by a spring 32a on shaft 9. A U-shaped spring 28 shown in Figure 5 is attached at one end of the head of sliding bolt 23, and the other end attached to the housing 8, by a spot weld or screw indicated as 28a and assists in the shifting and holding of the bolt 23, to the different positions in the slot 18. The extended shank 23a of bolt 23 is of triangular shape to fit into the holding notches 19 or 20. A retractive spring 29 normally holds bolt 23 in one of said notches when shifted to either position. One end of spring 29 is attached to plate 12 by bolt 30, and the other end is affixed through the head of said bolt 23.

In order to force the cone 31 and its pinions out of mesh with the ring gear and so permit the latter to be raised or lowered to a new position, an actuating plunger 35 is slidably mounted through a sleeve and the holding plate 12. One end of this plunger normally rides on the inside face of largest pinion 33, outside the teeth on pinion 34. A light coil spring 36 with bearing washer 37 and pin 38 holds the plunger in suitable position for use. The lower end 42 of a bell crank is positioned over the outer end of the plunger to be operated at any time by the rider. When the crank 42 is compressed against the plunger, it overcomes the tension of the spring 32a and forces the cone and pinions outward along the crank shaft 9, to disengage one pinion from the ring gear and permit the operator to bring another pinion into mesh with the ring gear for a different speed.

The bell crank is pivotally mounted on a pin 44 which latter is supported by an arm 39 attached to the frame 7 by clamp 40 and bolts 41. The upper lever end 43 of the bell crank is raised or lowered by a shift rod 50, extended therefrom up to and pivotally connected to one end 47 of a hand lever 45. Said hand lever is mounted on a pivot 48 in plate 49 affixed to the upper bicycle frame 7'. When the hand lever 45 is drawn backward by the rider for raising the rod 50, as described, a second shift rod 51 is pressed down from the back end of the lever 45 for releasing the bolt 23 from one of the notches along slot 18. This permits a lowering or raising of the ring 21 together with the ring gear for meshing in a different pinion, for a different speed. Such releasing of bolt 23 is caused by yoke arm 53 on the lower end of rod 51, and mounted over the head of bolt 22 and held by pin 54. The bolts 22, 23 and 24 are so loosely mounted in their respective slots as to permit sufficient lateral movement. This permits the disengagement of the shank 23a from the notches 19 and 20, when the yoke arms 52 press the bolt 22 against the opposite edge of slot 18. As before stated the bolt 24 serves as a pivot for sufficient rocking of the ring 21 to permit the shank 23a to be moved to and from the different notches. When the lever 45 is moved forward the yoke 53 carries the bolt 22 back up again.

Having described my invention, I claim as new for patent protection:

1. A bicycle for a plurality of speeds, comprising a bicycle with a squared crank shaft, a plurality of pinion gears of different sizes slidably mounted on the shaft, a supporting plate attached to the frame of the bicycle, a bearing ring adjustably connected to the plate, a sprocket wheel rotatably mounted on the bearing ring, internal teeth carried in the sprocket wheel adapted to mesh in the teeth of either one of said pinions, and means for shifting the position of the sprocket to bring said internal teeth in mesh with either of said pinions for different speeds.

2. A bicycle adapted for a plurality of speeds, comprising a squared crank shaft, driven in the usual manner, a cone with a plurality of pinion gears of different diameters slidably mounted on the shaft, an internal ring gear adjustably mounted around said pinions with teeth adapted to mesh in the teeth of any of said pinions, a spring around said shaft for pressing the pinions inward, a plunger adapted to compress said cone and pinions outward on said shaft and to disengage the teeth of said pinions from the teeth of said ring gear, means for raising and lowering said ring gear when so disconnected to bring the same into alinement with the teeth of a different pinion, a lever on the top of the bicycle for manual operation for shifting the position of said ring gear, and means for holding said sprocket and ring gear in the different positions for driving the wheels of the bicycle.

3. A bicycle adapted for a plurality of speeds, comprising a bicycle with a squared crank shaft, a cone carrying a plurality of pinion gears of different numbers of teeth slidably mounted on the shaft, a larger ball bearing ring gear encircling the cone, and adapted to be raised and lowered to mesh in the teeth of the different pinions, means for maintaining the teeth of the pinions and ring gear in mesh, and means for shifting the position of the ring gear and pinions simultaneously while the bicycle is in motion for changing the speed thereof.

ANDREW J. PEHL.